United States Patent Office 3,103,004
Patented Sept. 3, 1963

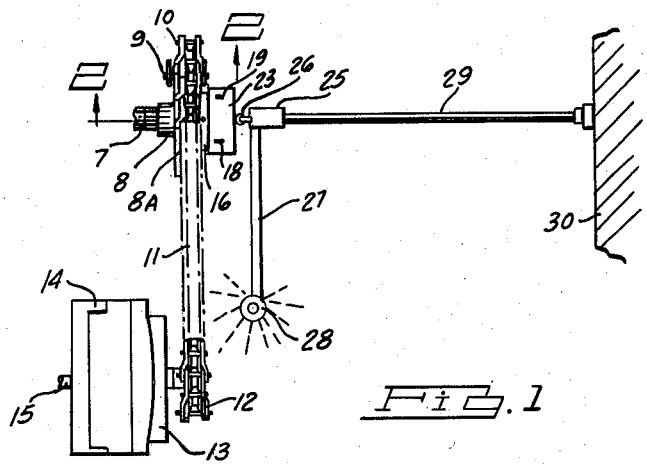
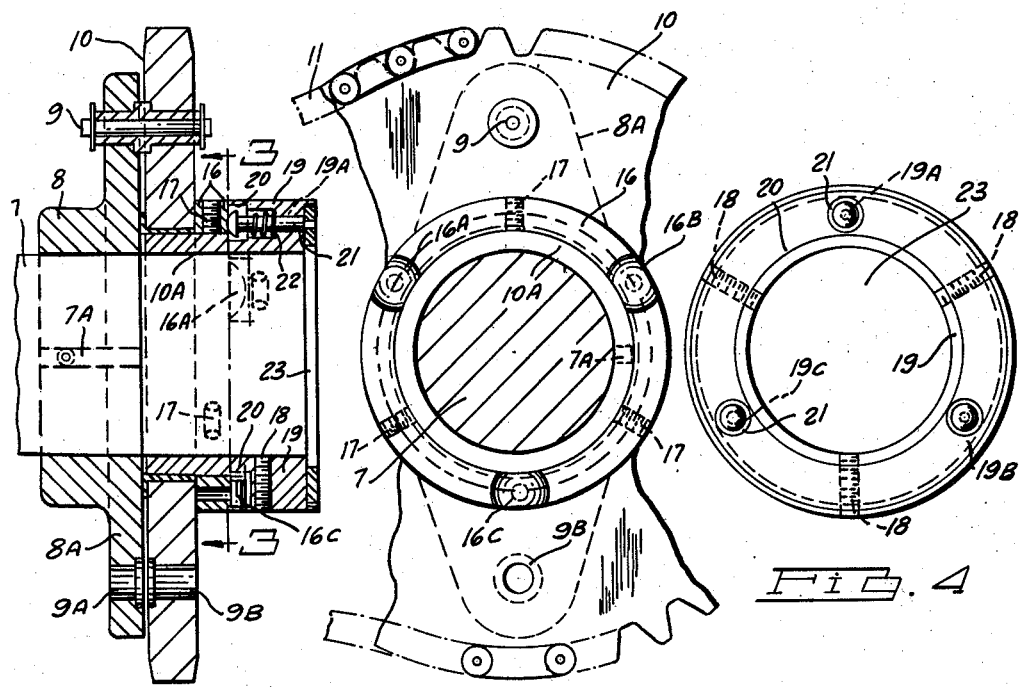

3,103,004
TORQUE ALARM
James J. Murray, 14011 Oakland Ave., Detroit 3, Mich.
Filed Aug. 8, 1961, Ser. No. 130,024
1 Claim. (Cl. 340—271)

This invention relates to alarm, or signal devices, and has particular reference to a device for indicating the operating condition of a shear pin hub, slip clutch, or the like.

An object of the invention is to provide a device which will signal the fact that a shear pin has been severed because of overload or the like, so that the machine operator may correct the difficulty before extensive damage is done to equipment, or loss of productive time is had before discovery. The device is of particular value where such shear pins, or slipping clutches are located at remote places not readily accessible for routine inspections.

So far as I am aware, no one has up to this time disclosed such a signaling device, although I am aware of the fact that others have employed an axial cam movement and limit switch, for effecting a cutout of machine operation. Such devices, however, heretofore known to the public have been cumbersome, expensive to manufacture and tailored to the specific machine and were not readily adaptable to other devices, nor interchangeable such as the device herein disclosed.

The devices heretofore known to the public when used as cutouts could not and cannot pinpoint the difficulty encountered, for the reason that the machine might also stop because of power failure, or other cause, which cause might be greatly removed from a particular shear pin, or clutch assembly, the condition of which it is desired to protect.

Another object, therefore, of this invention is to provide a torque alarm device which is simple in construction, economical to manufacture, and highly efficient in operation, and one which may be applied to shear pin hubs for sprockets, sheaves, pulleys and the like, or which may be applied to any device, where it is desirable to indicate the relative movement of one element with reference to another.

The foregoing and other objects and advantages of the invention will become more apparent as the description proceeds, reference being made from time to time to the accompanying drawing forming part of the within disclosure, in which drawing:

FIG. 1 is a fragmentary plan view, with parts in section, of a device embodying the invention.

FIG. 2 is a section taken substantially on the line 2—2 of FIG. 1.

FIG. 3 is a view, partly in section and with parts broken away, and taken substantially on the line 3—3 of FIG. 2, and illustrates the appearance of the cam ring and cams, with the cam followers, cam follower ring, and pressure plate removed.

FIG. 4 is a plan view of the cam followers, cam follower ring and pressure plate, removed from the structure shown in FIG. 2.

Referring now more particularly to the drawing, it will be understood that in the embodiment disclosed in FIG. 1, the reference character 7 indicates, in general, a driven shaft on which is keyed, as at 7A, a shear pin hub 8, to the flange 8A of which is secured by a shear pin 9, a sprocket 10, the latter being driven by a chain 11, which passes over a drive sprocket 12, which is driven through the gear reduction 13 by a motor 14, having a drive shaft 15. Added bores 9A and 9B are provided to accommodate additional shear pins, if desired. The foregoing are conventional elements and form no part of the invention, except as they are combined with the elements hereinafter described.

The novel structure embodying the invention comprises a cam ring 16, on one face of which is formed the cam lobes 16A, 16B and 16C (FIG. 3). The ring 16 is mounted on an extension of the sprocket hub 10A and is secured thereto by set screws 17, or other suitable means. The lobes 16A, 16B and 16C may be machined on the ring 16 or may be attached thereto by pins, or other suitable means. The lobes are equally spaced about the ring 16 and have suitable cam faces formed thereon to actuate the cam followers hereinafter described. In some applications, I may desire to form the cams directly on the face of the sprocket 10, but I prefer to provide a separate cam ring as hereinabove indicated.

Mounted on the shaft 7 and secured thereto by set screws 18 is a cam follower ring 19, which is provided with a concentric groove 20 in which the cams 16A, 16B and 16C are arranged to travel. The ring 19 is provided with equally spaced axial bores 19A, 19B and 19C in which reciprocate the cam followers 21, which are in the form of headed pins, which are spring-backed, as at 22 (FIG. 2). The three cam followers 21 are arranged to be contacted by the cams 16A, 16B and 16C simultaneously, so that there can be no binding. Secured at the outer ends of the cam followers 21 (FIG. 2) is a pressure plate 23 which is arranged to move laterally, in one direction, under the influence of the cams, and in the opposite direction by the springs 22. Inasmuch as the ring 19 is secured to the shaft 7 it will rotate with the shaft at all times, and when the shaft 7 stops rotating, it will cease rotating also. The sprocket 10, however, is fixed to the hub 8 only through the shear pin 9 and rotates the hub 8 only when the shear pin 9 is intact. When the pin 9 is sheared by any overload on the shaft 7, the sprocket 10 and its hub 10A will rotate freely on the now non-rotating shaft 7. The cam ring 16 being fixed to the sprocket hub 10A will rotate with the sprocket 10. As the cams 16A, 16B and 16C strike the followers 21, the springs 22 will be compressed and the pressure plate 23 will be moved outwardly. As the cam followers 21 run off of the cam lobes, the pressure plate 23 will be returned to its normal position as shown in FIG. 2.

In order to indicate the free running of the sprocket 10 and the attached cam ring 16 on the shaft 7, I provide a limit switch 25, which has a roller 26 in contact with the pressure plate 23. As the pressure plate 23 moves laterally under the influence of the cam followers 21, the limit switch will be actuated to open and close the circuit 27 in which is remotely positioned a light 28, or bell, or other warning device. The switch 25 is preferably supported on a conduit 29 which also carries the electrical connections to the switch 25 from a power source behind the wall 30.

Although I have herein disclosed the device as used in connection with a sprocket, it will be understood that it may be employed with a driven pulley, sheave, slip clutch, or the like, where it is desired to signal the fact that there is relative motion between two parts.

It is believed that the operation of the device is obvious from the foregoing description.

Having described my invention, what I claim and desire to secure by Letters Patent is:

A torque alarm device for use with any shaft driven member, comprising a hub secured for rotation with said shaft, said hub having a pair of radial ears, aligned apertures in said ears and said driven member, a shear pin in said apertures, an extension on said driven member concentric with said shaft, a cam ring concentric with said extension and secured thereto by set screws, spaced cam lobes on the side of said ring away from said driven member, a cam follower ring on said shaft and secured thereto by set screws, a concentric groove in said last named ring arranged to receive the said cam lobes, spaced axial bores in said last named ring, a spring biased cam follower reciprocable in each of said bores and arranged to be simultaneously struck by said cam lobes upon the rupture of said shear pin, a pressure plate secured to the outer ends of said cam followers and moveable therewith, said pressure plate being normally spaced from and being arranged to contact the limit switch of a conventional signal device.

References Cited in the file of this patent

UNITED STATES PATENTS

| | | |
|---|---|---|
| 1,412,444 | Baker et al. | Apr. 11, 1922 |
| 1,583,889 | Lariviere | May 11, 1926 |
| 1,972,601 | Regan | Sept. 4, 1934 |
| 2,124,965 | Lind | July 26, 1938 |
| 2,652,914 | Christensen | Sept. 22, 1953 |
| 2,901,076 | Dean | Aug. 25, 1959 |